United States Patent [19]

Yamane et al.

[11] Patent Number: 5,070,285

[45] Date of Patent: Dec. 3, 1991

[54] MOTOR STOP CONTROL DEVICE

[75] Inventors: Daiji Yamane; Nobuyuki Horie; Aisaku Taguchi; Teruki Sugiura, all of Yamatokoriyama, Japan

[73] Assignee: Sharp Kabushiki Kaisha, Osaka, Japan

[21] Appl. No.: 305,406

[22] Filed: Feb. 2, 1989

[30] Foreign Application Priority Data

Feb. 5, 1988 [JP] Japan ................... 63-26266

[51] Int. Cl.$^5$ .............................................. G05B 5/00
[52] U.S. Cl. .................................. 318/461; 388/811; 388/814
[58] Field of Search ................ 318/599-603, 318/739-741, 757-764, 807.81, 256-258, 261, 264-265, 268-269, 282, 286, 362, 364-369, 461-464, 470; 388/800-802, 809-815, 911

[56] References Cited

U.S. PATENT DOCUMENTS 4,510,430 4/1985 Ashikaga .......................... 318/800

FOREIGN PATENT DOCUMENTS 2167252A 5/1986 United Kingdom .

OTHER PUBLICATIONS

"Patent Abstracts of Japan", vol. 9, No. 48, p. 338, Japanese Application No. 59-186174.
"Patent Abstracts of Japan", vol. 10, No. 382, p. 529, Japanese Application No. 61-172271.
"Patent Abstracts of Japan", vol. 9, No. 163, p. 371, Japanese Application No. 60-40565.
"Patent Abstracts of Japan", vol. 8, No. 228, p. 308, Japanese Application No. 59-107453.

Primary Examiner—William M. Shoop, Jr.
Assistant Examiner—David Martin

[57] ABSTRACT

A motor stop control device for stopping a motor rapidly. The motor control includes a pulse generator for generating a pulse signal having a pulse width which is in relation to the speed of the motor, a CPU, and a drive for driving the motor. When a motor stop command signal is produced when the motor being rotated forward, CPU operates the drive to produce a counter drive torque, and, at the same time, CPU starts to compare the pulse width of the present pulse signal with that of the previous pulse signal, and produces a signal when the pulse width of the present pulse signal becomes shorter than that of the previous cycle. When the signal is produced, the drive stops to produces the counter drive torque.

6 Claims, 2 Drawing Sheets

MOTOR STOP CONTROL DEVICE

BACKGROUND OF THE INVENTION

1. Field of the Invention

The present invention relates to a motor control device for use, for example, in magneto-optical disk devices for controlling the rotational stop of spindle motors employed therein.

2. Description of the Prior Art

Conventionally, this type of motor stop control device stops the rotation of the motor by utilizing a counter torque, which may be either a reverse torque when the motor is rotating in a forward direction, or a forward torque when the motor is rotating in a reverse direction. The timing to remove the counter torque is determined according to a cycle of a pulse signal produced by a pulse generator having a frequency which corresponds to the rotational speed of the motor. Specifically, as shown in FIG. 4, when the stop signal is emitted during forward drive, the reverse direction torque is added causing the speed to decrease. A time length for applying the reverse direction torque is determined such that the pulse width of the pulse signal is compared with a predetermined time t, and when the pulse width exceeds the time t, the reverse direction torque is removed.

In a conventional motor rotation stop controller as described above, which compares the pulse width of the pulse signal with a predetermined time t and stops the counter torque when the pulse width is longer than time t, the disadvantages occur. When the time t is selected to be short, the counter torque is removed before the rotational speed of the motor decreases, thus increasing the total time to completely stop the motor which is a disadvantage. Conversely, when the time t is selected to be long, the motor may be actually driven in the reverse direction before the pulse width of the pulse signal become greater than the time t which is another disadvantage.

SUMMARY OF THE INVENTION

The present invention has been developed with a view to substantially solving the above described disadvantages and has for its essential object to provide an improved motor stop controller which is stable in operation, and simple in operation to provide a desired rapid and smooth stop of a motor.

In accomplishing these and other objects, according to the present invention a motor stop control for performing a rapid stopping the rotation of a motor a first direction, in response to a stop command signal includes a pulse generator for detecting the rotation of the motor and for generating a pulse signal having a frequency relative to the rotational speed of the motor. A driver for driving the motor at least in three different states (modes). The driver generates in a first mode a first direction driving torque, in a second mode a second direction driving torque, and in the third mode no torque pulse width detector for detecting a pulse width of the pulse signal and a storing means for storing a pulse width of the pulse signal obtained in a previous cycle. A comparator is used for comparing a pulse width obtained in a present cycle with the pulse width obtained in a previous cycle, and for producing a termination signal when the present pulse width is smaller than the previous pulse width. A control means is also used for controlling the driver such that in response to the receipt of the stop command, the driver drives the motor to generate the second direction driving torque, and in response to the termination signal, the driver drives the motor to generate no torque.

According to the present invention, since the counter torque is stopped when the motor starts to rotate in the reverse direction, the motor will never actually drive in reverse. Furthermore, since the above system may be provided in combination with other system, the motor can be stopped rapidly and smoothly.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DETAILED DESCRIPTION OF THE PREFERRED EMBODIMENTS

Figure 1:
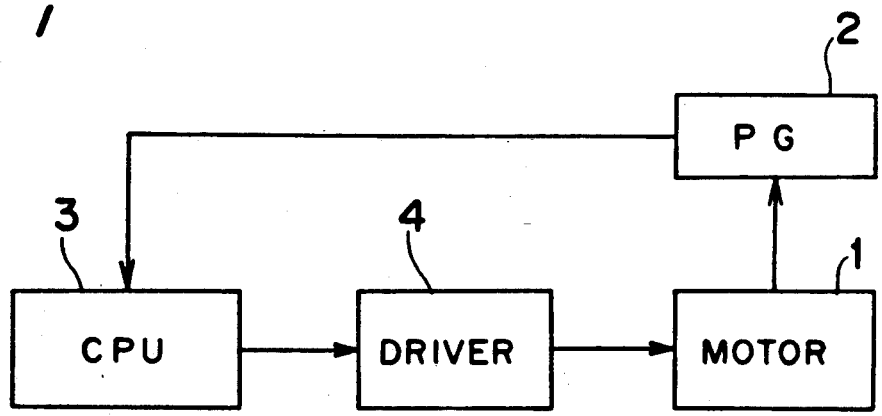
FIG. 1 is a block diagram of a motor stop control device according to the present invention.
Figure 2:
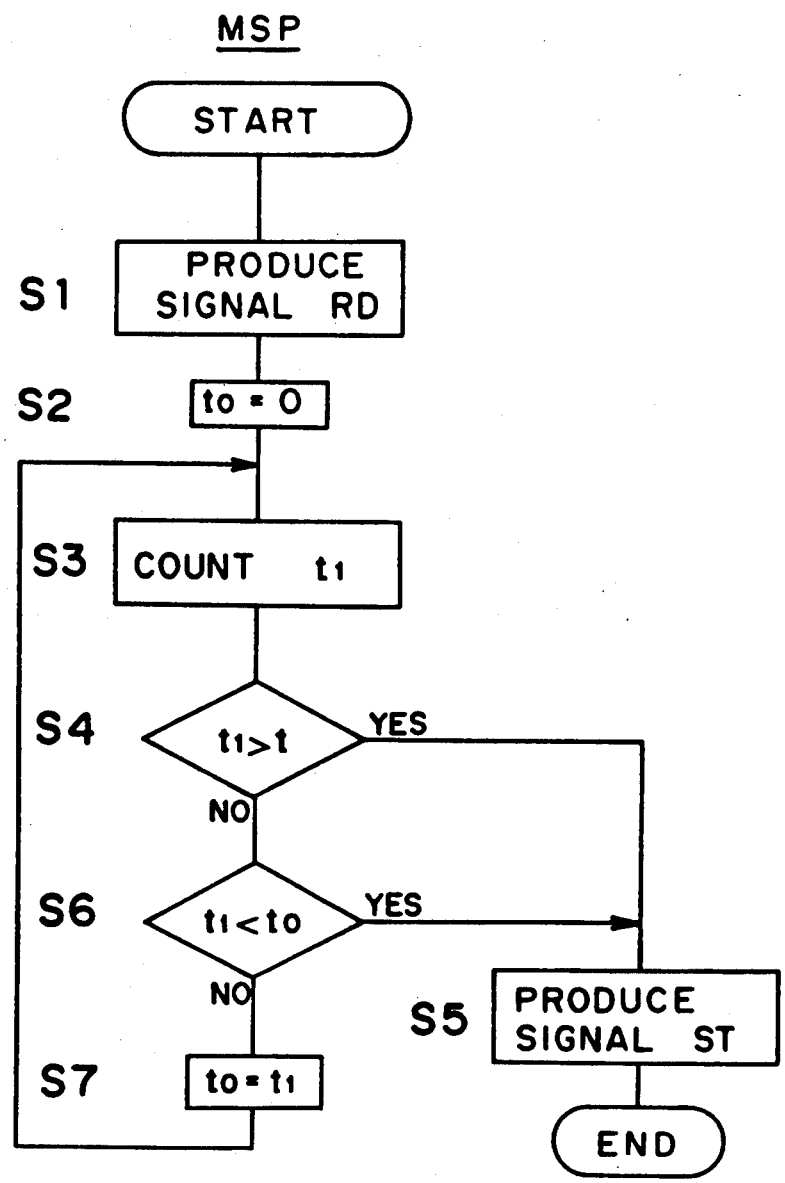
FIG. 2 is a flow chart of an operation carried out in a CPU shown in FIG. 1.
Figure 4:
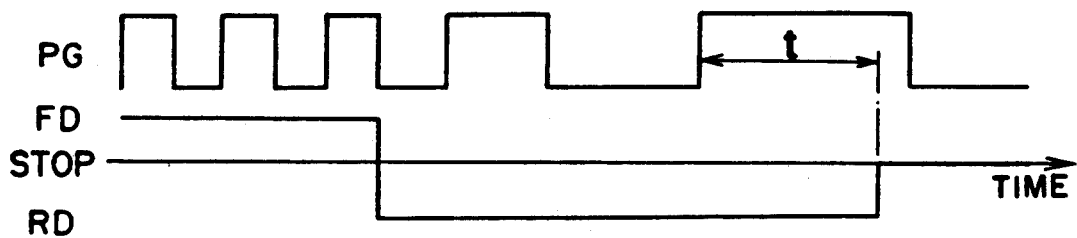
FIG. 4 is a graph showing the motor control state and the pulse signal according to a conventional device.

Referring to FIG. 1, a motor stop control device according to a preferred embodiment of the present invention is shown. In the drawing, reference number 1 is a motor which drives, for example the spindle of the magneto-optical disk, and 2 is a pulse generator which detects the rotation of motor 1 and outputs a rectangular shaped pulse signal having a frequency relative to the rotational speed of the motor. For example, when motor 1 makes one complete rotation, 36 pulses are generated. Reference number 3 is a Central Processing Unit, which CPU, receives the pulse signal from pulse generator 2 for use in a motor stop control operation as shown in FIG. 2, and 4 is a driver which receives either one of forward drive signal FD, stop signal, ST, or reverse drive signal, RD, and drives motor 1 based on these signals FD, ST, and RD. When the signal FD is applied, driver 4 drives motor 1 to generate a forward driving torque. When the signal ST is applied, driver 4 drives motor 1 to generate no torque or a holding torque. And when the signal RD is applied, driver 4 drives motor 1 to generate reverse driving torque.

Referring to FIG. 2, a motor stop program, MSP, is shown which is initiated when CPU 3 receives from a pre-stage circuit (not shown) a stop command signal for stopping motor 1.

It is assumed that motor 1 is running forward, and when the stop command is received, CPU 3 starts the motor stop program MSP so that at step S1, CPU 3 produces the signal RD so as to generate the reverse driving torque in motor 1 to forcibly slow down the motor 1.

Next, at step S2, a memory t0 provided in CPU 3 is reset, i.e., set to 0 (zero). The value in memory t0 expresses the previous pulse width as will be described later.

Next, at step S3, a timer in CPU 3 operates to count the time of pulse width t1 (FIG. 3) of the pulse signal.

This is done in such a manner that CPU 3 detects whether the pulse signal PG is present or not. If yes, the timer in CPU 3 is incremented.

Next, at step S4, pulse width t1 of the pulse signal PG counted in step S3 is compared with a predetermined constant t. Constant t, is an empirically obtained value representing a pulse width of the pulse signal PG that will be produced at a moment immediately before motor 1 stops. At step S3, if the counted pulse width t1 of the pulse signal PG is greater than constant t, it is understood that motor 1 is about to stop, the program then goes to step S5 to produce the signal ST, thereby completely stopping the motor 1. Thereafter, the motor stop program MSP ends.

At step S4, if pulse width t1 of the pulse signal is smaller than constant t, the program advances to step S6 to compare the present pulse width t1 with the previous pulse width t0. At the first cycle of motor stop program MSP, the program advances to step S7, since memory t0 is initially set to 0. At step S7, the content of memory t0 is renewed with the present pulse width t1. Thereafter, next cycle of motor stop program MSP starts to repeat steps S3-S7.

Figure 3A:
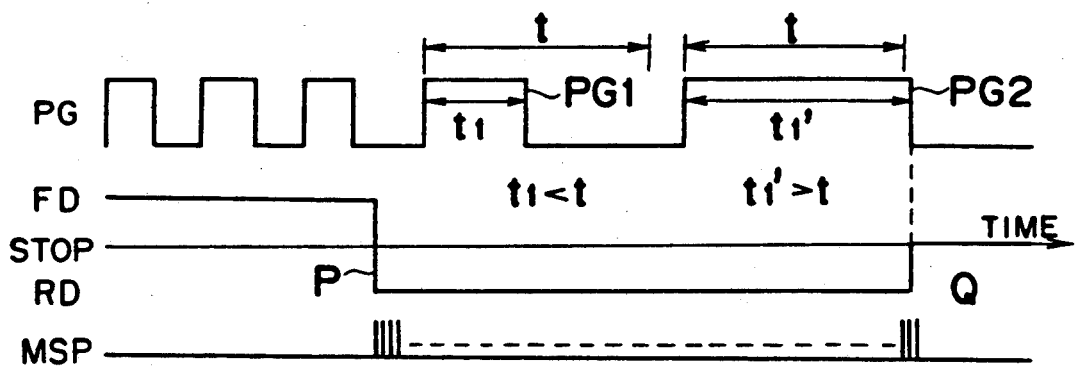
FIGS. 3a and 3b are graphs showing the motor control state and the waveform of the pulse signal according to the present invention.

Referring to FIG. 3a, a first example for stopping the motor 1 is shown. At time P, it is assumed that a stop command is produced so that the motor stop program MSP is initiated, as diagrammatically shown in the bottom row of FIG. 3a, in which each line pulse indicates one cycle of motor stop program MSP. Thus, at time P, CPU 3 which has been producing the forward drive signal FD starts to produce reverse drive signal RD (step S1 in FIG. 2). After a number of cycles, the timer for counting the pulse width t1 of pulse signal PG1 increases, but in the example shown in FIG. 3a, the pulse width t1 is smaller than the predetermined constant t. Therefore, steps S3, S4, S6 and S7 are repeated. At a cycle occurring immediately after the trailing edge of pulse signal PG1, the counted pulse width t1 is shifted to memory t0.

Thereafter, when the second pulse signal PG2 appears, the timer starts to count the pulse width t1', When the counted value for counting the pulse width t1' exceeds the predetermined constant t, such as at time Q in FIG. 3a, the program advances from step S4 to step S5, as shown in FIG. 2, to end the motor stop program MSP, eventually stopping the motor 1.

Figure 3B:
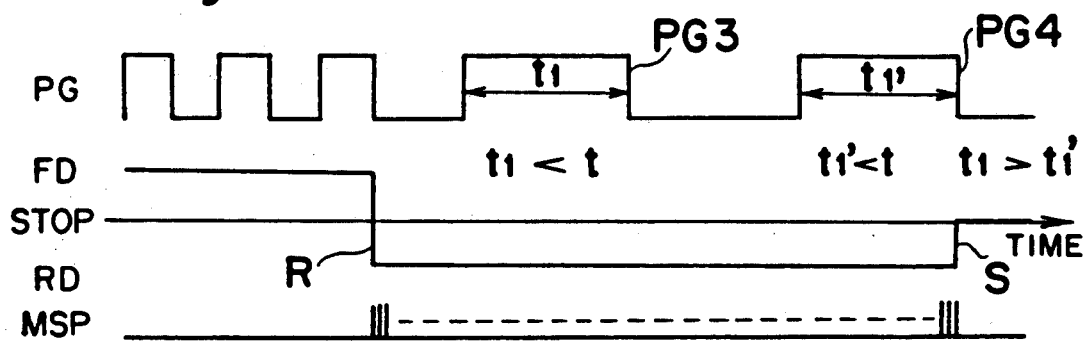

Referring to FIG. 3b, a second example, for stopping the motor 1 is shown. At time R, it is assumed that a stop command is produced so that the motor stop program MSP is initiated and, CPU 3 starts to produce reverse drive signal RD (step S1 in FIG. 2). After a number of cycles, the timer for counting the pulse width t1 of pulse signal PG3 increases, but in the example shown in FIG. 3b, the pulse width t1 is smaller than the predetermined constant t. Therefore, steps S3, S4, S6 and S7 are repeated. At a cycle occurring immediately after the trailing edge of pulse signal PG3, the counted pulse width t1 is shifted to memory t0.

Thereafter, when the second pulse signal PG2 appears, the timer starts to count the pulse width t1'. At the end of the second pulse signal PG2 (i.e., time Q), if it is detected that the counted value of the pulse width t1' is smaller than the predetermined constant t, but is greater than the pulse width t0=t1 of the previous pulse PG3, the program advances from step S6 to step S5 to end the motor stop program MSP, eventually stopping the motor 1. In this example, it is detected that the motor has just started to rotate in the reverse direction.

A similar operation is performed when stopping the motor during the reverse direction rotation.

According to the present invention, since the reverse drive signal RD of the motor is stopped immediately before or after the complete stop of the motor 1, motor 1 can be stopped in a stable manner without making any reverse turn. Also, according to the present invention, since the actual reverse drive of the motor can be prevented, it is possible to select the time t to have a relatively long time.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A motor control for stopping a rotor rapidly in response to a stop command signal comprising:
   a pulse generator for detecting the rotation of a motor and for generating a pulse signal having a frequency relative to the rotational speed of the motor;
   a driver for driving the motor at least in three different modes which generate, in a first mode a first direction driving torque, in a second mode a second direction driving torque, and in a third mode applying no torque;
   pulse width detecting means for detecting a pulse width of the pulse signal;
   storing means for storing a pulse width of a pulse signal obtained in a previous cycle;
   comparator means for comparing a pulse width obtained in a present cycle with a pulse width obtained in a previous cycle, and for producing a terminating signal when said present pulse width is smaller than said previous pulse width;
   control means for controlling said driver such that in response to the receipt of a stop command, said driver drives said motor to generate said second direction driving torque, and thereafter in response to said terminating signal, said driver drives said motor to generate no torque.

2. The apparatus of claim 1 wherein said control means includes a CPU.

3. The apparatus of claim 1 wherein the motor drive can drive a magnetic optical disk.

4. A motor control for stopping a motor rapidly in response to a stop command signal comprising:
   a pulse generator for detecting the rotation of a motor and for generating a pulse signal having a frequency relative to the rotational speed of the motor;
   a driver for driving the motor at least in three different modes which generate in a first mode a first direction driving torque, in a second mode a second direction driving torque, and in a third mode applying no torque;
   pulse width detecting means for detecting a pulse width of said pulse signal;
   storing means for storing a pulse width of a pulse signal obtained in a previous cycle;
   first comparator means for comparing said pulse width with a predetermined pulse width and for producing a first termination signal when said pulse width exceeds said predetermined pulse width;

second comparator means for comparing said pulse width obtained in a present cycle with said pulse width obtained in a previous cycle, and for producing a second termination signal when said present pulse width is smaller than said previous pulse width;

control means for controlling said driver such that in response to the receipt of a stop command, said driver drives said motor to generate said second direction driving torque, and thereafter in response to either one of two of said first and second termination signals, said driver drives said motor to generate no torque.

5. The apparatus of claim 4 wherein said control means includes a CPU.

6. The apparatus of claim 4 wherein the motor drive can drive a magnetio-optical disk.

* * * * *